United States Patent
Krone et al.

(10) Patent No.: US 8,413,609 B2
(45) Date of Patent: Apr. 9, 2013

(54) DEVICE FOR COLONIZING AND HARVESTING MARINE HARDGROUND ANIMALS

(75) Inventors: Roland Krone, Bremen (DE); Philipp Kraemer, Oldenburg (DE)

(73) Assignee: Stiftung Alfred-Wegener-Institut fuer Polar-und Meeresporschung, Bremerhaven (DE)

( * ) Notice: Subject to any disclaimer, the term of this patent is extended or adjusted under 35 U.S.C. 154(b) by 180 days.

(21) Appl. No.: 12/964,860

(22) Filed: Dec. 10, 2010

(65) Prior Publication Data

US 2011/0139083 A1  Jun. 16, 2011

(30) Foreign Application Priority Data

Dec. 13, 2009 (DE) .......................... 10 2009 058 278

(51) Int. Cl.
*A01K 61/00* (2006.01)
(52) U.S. Cl.
USPC ............. 119/200; 119/208; 119/213; 43/100; 43/102
(58) Field of Classification Search .................. 119/200, 119/208, 213, 238; 43/100, 102
See application file for complete search history.

(56) References Cited

U.S. PATENT DOCUMENTS

| | | | | |
|---|---|---|---|---|
| 1,556,401 A | * | 10/1925 | Beckmann | 43/100 |
| 3,499,421 A | * | 3/1970 | MacDonald et al. | 119/208 |
| 4,301,612 A | * | 11/1981 | Ciulla | 43/100 |
| 4,432,638 A | * | 2/1984 | Tarsia | 355/63 |
| 4,601,080 A | * | 7/1986 | Cook | 15/3.12 |
| 5,596,947 A | * | 1/1997 | Creppel et al. | 119/223 |
| 5,628,280 A | * | 5/1997 | Ericsson | 119/239 |
| 5,640,800 A | * | 6/1997 | Peterson | 43/100 |
| 6,186,702 B1 | | 2/2001 | Bartkowski | |
| 2006/0170221 A1 | * | 8/2006 | Wobben | 290/54 |
| 2007/0193115 A1 | | 8/2007 | Buck | |

FOREIGN PATENT DOCUMENTS

| | | | |
|---|---|---|---|
| DE | 20310089 U1 | | 12/2004 |
| DE | 102004010652 B4 | | 10/2005 |
| EP | 1466523 A2 | * | 10/2004 |
| GB | 2270664 A | * | 3/1994 |
| WO | WO 2004/075633 A1 | | 9/2004 |
| WO | WO 2004075633 A1 | * | 9/2004 |

OTHER PUBLICATIONS

Buck, Bela Hieronymus, "Co-use of offshore wind farms for mariculture: status quo, problems, and prospects." Meeresumwelt-Symposium, p. 167-179, 2005.

* cited by examiner

*Primary Examiner* — Isam Alsomiri
*Assistant Examiner* — Justin Benedik
(74) *Attorney, Agent, or Firm* — Leydig, Voit & Mayer, Ltd.

(57) ABSTRACT

A device for colonizing and harvesting marine hardground animals in an underwater region of a ground-based offshore edifice includes at least one rail device configured to extend vertically on the offshore edifice along a height of the underwater region to above a waterline. The device also includes a netting array including a habitat carriage having a habitat and trapping basket that is adapted to contain the hardground animals. A lifting device is configured to move the netting array along the at least one rail device. Additionally, the device includes a scavenging carriage including a basic unit and a running unit that is configured to detachably couple the scavenging carriage with the at least one rail device so as to be movable thereon. The scavenging carriage is configured to detachably couple with the habitat carriage and the lifting device.

13 Claims, 4 Drawing Sheets

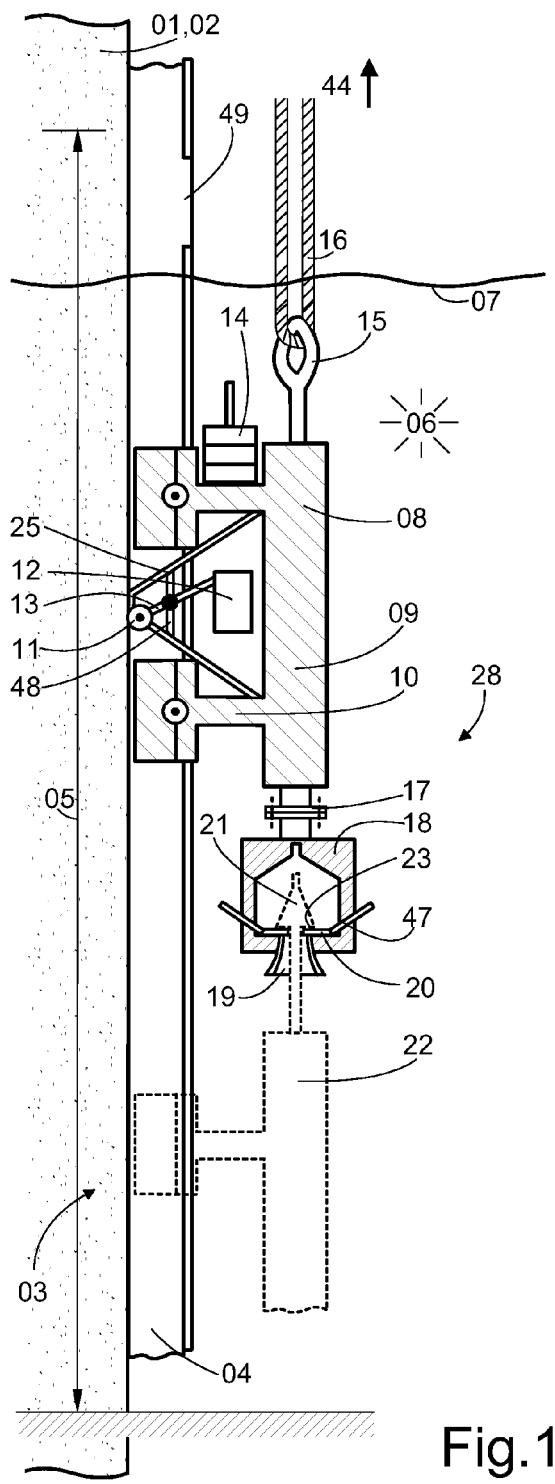
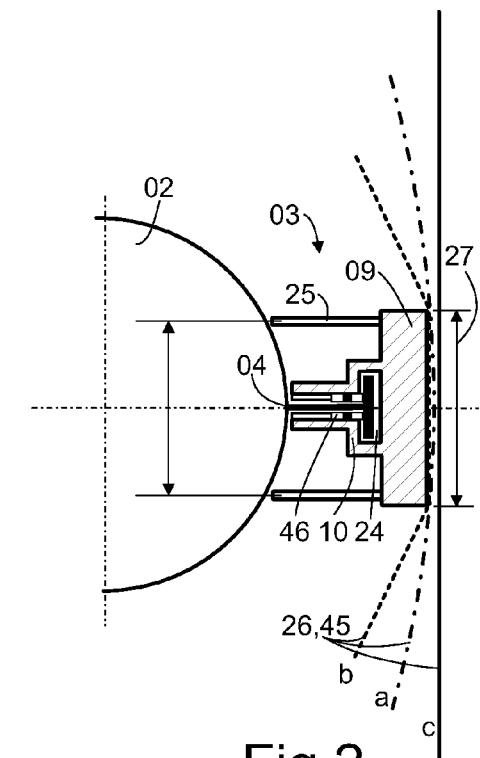
Fig.1
Fig.2

DEVICE FOR COLONIZING AND HARVESTING MARINE HARDGROUND ANIMALS

CROSS-REFERENCE TO PRIOR APPLICATIONS

Priority is claimed to German Patent Application No. DE 10 2009 058 278.9, filed Dec. 13, 2009, the entire disclosure of which is hereby incorporated by reference herein.

FIELD

The invention relates to a device for colonizing and harvesting marine hardground animals in the underwater region of ground-based offshore edifices.

BACKGROUND

Marine edifices are suitable for colonization by hardground animal species. This can be observed especially clearly in areas marked by the absence of natural colonization structures, such as in the softground regions of the southern North Sea. The surfaces of the edifices, such as pylons of wind power plants, are here used as colonizing surfaces by the reef animals. In order to augment such reef animals, various types of so-called "artificial reefs" are assembled or submerged into the sea worldwide. Net fishing with draw nets and beam trawl nets is difficult or impossible in the immediate proximity to marine edifices. In addition, it is not sustainable, and can quickly lead to overfishing. Marine hardground animals, such as lobsters, crabs, snails, mollusks and several types of fish, have previously been caught in inaccessible areas or not readily fishable sea floors using baited traps, such as lobster creels. However, baited traps have to be brought in again a short time after set up. Therefore, they cannot be left on site for an indeterminate time, for example during inclement weather, without jeopardizing the catch. In addition, such traps may get caught on parts of edifices or be shifted into impermissible positions on foundation structures on the sea floor as the result of currents and wave dynamics. As a result, they cannot be placed precisely in the most favorable positions on the foundation structures. In addition, such traps themselves do not provide an attractive colonization habitat. Further, the traps must be specially marked with lines and buoys, which can tear away when used on offshore edifices or lead to other problems.

U.S. Pat. No. 6,186,702 describes a habitat and trapping device that can be used for lobsters, for example, a so called "artificial reef", which is simply released onto the sea floor and retrieved again when necessary. U.S. Pat. No. 5,596,947 describes larger holding boxes, which are lowered from inclined rope guides from a special platform and hauled in again. Vertically submergible stacked habitat and harvesting boxes are described in WO 2004/075633 A1.

DE 203 10 089 U1 describes a netting array in the area of a wind power plant pylon for colonizing and harvesting hardground animals, which can be lowered and retrieved by means of a cable winch as the lifting device. The netting array is here designed as a basket that is relatively unattractive to the hardground animals and which is simply lowered into the water or placed on the sea floor. This netting array is positioned as desired by means of a rail system, which partially or completely horizontally envelops the pylon in a radial plane, and has hooked into it a framework for the cable winch. Therefore, a horizontally running rail system is known for positioning a netting array as desired around the periphery of the pylon. The netting array is lowered and retrieved exclusively via the cable winch, unguided in the free sea currents, thereby creating a strong dependency here. The settling netting array can here threateningly get into the operating area of the edifice or any service facilities on hand. The net fishing array cannot be precisely positioned. Additionally, U.S. 2006/0170221 A1 for the same object describes to lower and retrieve a special, detachable catching substrate via an electrical cable winch directly on the pylon, so that the pylon itself here provides a kind of guide. However, the latter is not supported by securing elements, so that sea currents can here also be disruptive, and impede the harvesting process.

EP 1 466 523 A2 describes an extremely complicated design for bilaterally harvesting vertical netting substrates colonized by mollusks, for example. Two harvesting roller bands are here lowered on either side of the netting substrate on a vertical rail system. The band movement transports the colonized mollusks toward the water surface. The vertical rail system with the harvesting roller bands is secured to the side of a ship correspondingly positioned over the substrate. Lastly, described in GB 2 270 664 A is another vertical rail system with a moving carriage for the attachment of devices, which is arranged downward from the water line in the underwater region of a column of a footbridge. A boat can be connected with the rail system by means of a fender, so that depth-induced fluctuations in the boat level can be offset by vertically moving the fender on the rail system.

SUMMARY

In an embodiment, the present invention provides a device for colonizing and harvesting marine hardground animals in an underwater region of a ground-based offshore edifice. The device includes at least one rail device that is configured to extend vertically on the offshore edifice along a height of the underwater region to above a waterline. The device also includes a netting array including a habitat carriage having a habitat and trapping basket that is adapted to contain the hardground animals. A lifting device is configured to move the netting array along the at least one rail device. Additionally, the device includes a scavenging carriage including a basic unit and a running unit that is configured to detachably couple the scavenging carriage with the at least one rail device so as to be movable thereon. The scavenging carriage is configured to detachably couple with the habitat carriage and the lifting device.

BRIEF DESCRIPTION OF THE DRAWINGS

The device according to the invention for colonizing and harvesting marine hardground animals in the underwater region of ground-based offshore edifices with at least one rail device for accommodating in whatever location desired a netting array for the hardground animals that can be vertically moved by means of a lifting device will be described in even greater detail below based on the diagrammatic, exemplary figures not drawn to scale. The invention is not limited to the exemplary embodiments. Other features and advantages of various embodiments of the device according to the present invention will become apparent by reading the following detailed description with reference to the attached drawings which illustrate the following:

FIG. 1 is a side view of the scavenging carriage;
FIG. 2 is a cross section of the scavenging carriage.

DETAILED DESCRIPTION

Figure 3:
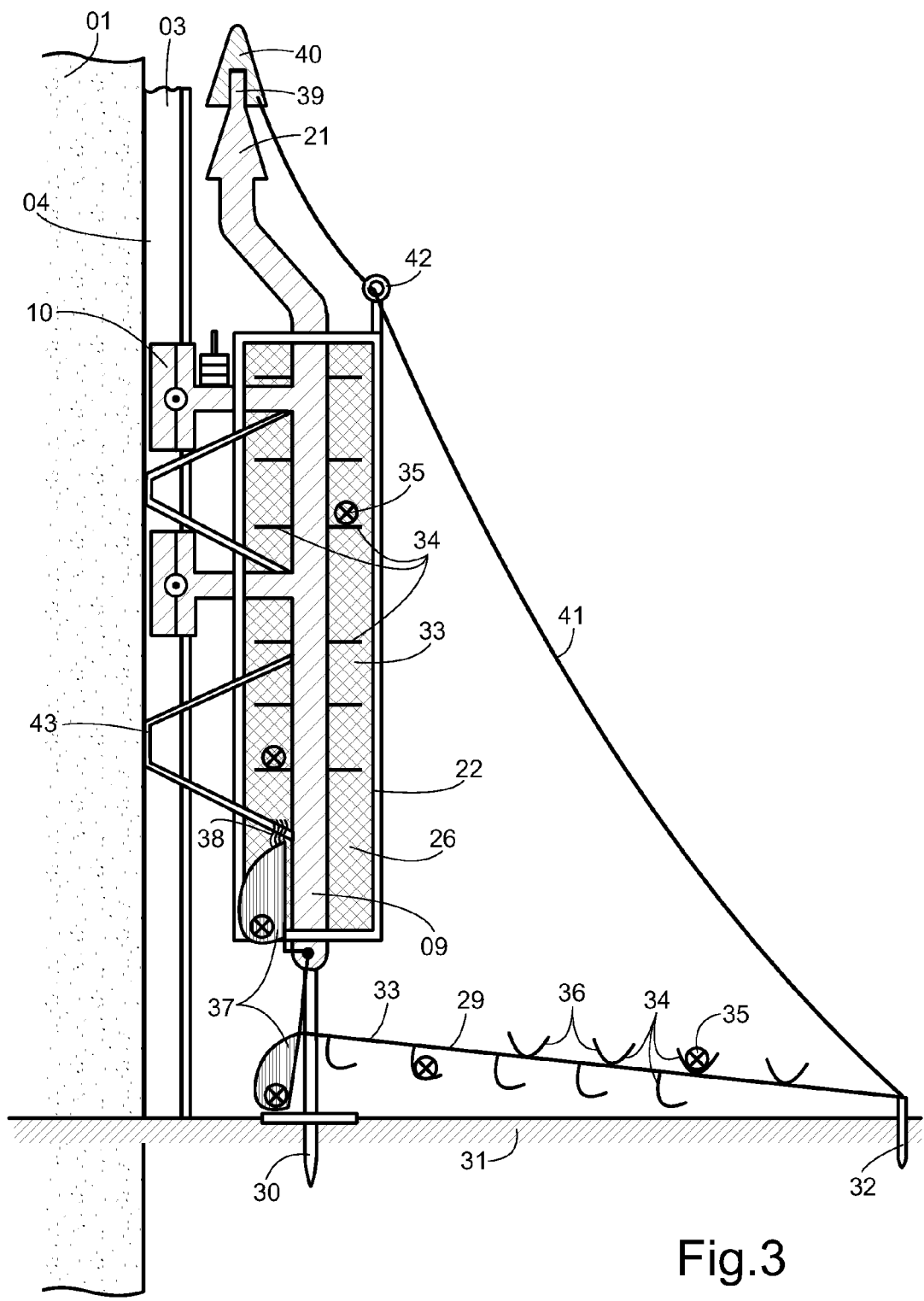
FIG. 3 is a side view of the submerged habitat carriage with opened habitat and trapping flap.

In an embodiment, the present invention provides a device that enables an especially precise and reliable deployment and retrieval of a netting array, without having to depend on the prevailing currents in proximity to the edifice or disruptively interfere in the operational area of the edifice. At the same time, however, the device is easy and reliable to access and operate.

The device according to an embodiment of the present invention exhibits at least one vertically arranged rail device, which extends over the height of the underwater region until above the waterline. Above the waterline, the device can be easily serviced with "dry feet" from a boat or a platform secured to the pylon, i.e., loaded and unloaded. The rail device is loaded with a habitat carriage having a habitat and trapping basket as the netting array, and temporarily with a scavenging carriage. Both the habitat carriage and scavenging carriage each have a base unit and at least one running unit that allows them to be detachably coupled with and travel on the rail system. In addition, the carriages have means with which they can be detachably coupled to each other. Finally, the scavenging carriage can be detachably coupled with the lifting device. The invention uses the direct proximity to the edifice, which results in a particularly good utilization and enrichment of the existing aufwuchs. In addition, arranging the device directly on the edifice (installation depth of the rail device in a range of 20 cm) does not significantly increase its flow resistance, and the working area is not impaired. Constructing the rail device in a fixed location makes it possible to deploy, store and retrieve the carriages in an especially location-precise way.

In an embodiment, the invention provides at least one vertically running rail device in the entire underwater region of a pylon, for example, on which the habitat carriage can be lowered to the seafloor in a precisely defined way without being influenced by arising currents. To this end, the running units of the habitat carriage are coupled into the rail system via the end of the rails or recesses in the rails above the waterline and simply released. The weight of the habitat carriage causes it to drift down to the seafloor along the rails. On the seafloor, the habitat carriage can be left however long desired in the rail system and is there colonized by hardground animals. The invention prevents the habitat carriage from drifting away in the current or wave dynamics or the operational area of the offshore edifice from becoming impaired by protruding or outwardly drifting parts or ropes. The habitat carriage is scavenged at any time with the use of the scavenging carriage. For this purpose, the running units of the latter are also coupled above the waterline with the rail device, but also with the lifting device. The scavenging carriage is subsequently released, and drifts downward toward the seafloor, wherein the lifting device correspondingly slackens the rope so as not to impede submersion. While sinking, the scavenging carriage then encounters the already submersed habitat carriage, and is coupled securely, yet detachably, thereto by means of a corresponding device. The aggregate comprised of the scavenging carriage and habitat carriage is then retrieved together via the lifting device. The aggregate can here be pulled so far out of the water that the habitat carriage under the scavenging carriage also lies above the waterline, and again accommodated in a "dry feet" zone, i.e., decoupled from the rail device or collected.

The device according to an embodiment of the present invention acts as an auxiliary habitat at offshore edifices, such as the columns of wind power plants. At the same time, it serves as a trapping and harvesting device with a fixed location, which can be used for commercial purposes without laying bait in these agglomeration points for fishable types of animals. The device can be used to fish for all animals that settle in the additionally created habitat. Further, depending on the design of the device, animals encountered can also be caught in direct proximity to the device, for example in the gap between the device and edifice, or on the ground near the device. The edifices already existing or awaiting construction can also be subjected to secondary commercial use, which as a rule often lends considerable support to cost-intensive conversion of the primary form of economic output, frequently power production (multifunctional use of offshore edifices). The animals to be harvested live on the additional substrate artificially created with the invention, and thus are not encountered in only isolated numbers in softground regions where offshore edifices are generally not erected. Only the excess number of animals in the partial area of the underwater structure are harvested. The offshore edifices here have a natural fouling community that provides sufficient nutrition for the colonizing harvest animals. While they do not have to be additionally fed, they can be. The objective of partial fishing approach and stabile conditions relative to nutrition and living space in the fished area combined with a sustained cultivation concept is to foster a stable recruitment of new animal species. The additional colonization surface of the habitat and trapping basket of the habitat carriage here serves as a colonizing area for both the animals being harvested and their nutrition or nutritional animals. Above all the ability to precisely remove the device here ensures a sustained cultivation and care relative to the local animal stock. In addition, the device can be used to protect the species and nature, provided that fishing (harvesting) only takes place on a limited basis or is even abandoned completely after its removal.

No separate edifice has to be erected for installing the device according to an embodiment of the invention. Prior to their offshore erection in the sea, the planned edifices must only be equipped with the simplest of accessories, for example, in the form of a rail device with an extremely simple design, that does not affect the load-bearing capacity. The rail device and scavenging carriage can here also be beneficially used for components other than for the netting array in an embodiment of the present invention, for example for submerging remote-controlled cameras, cleaning brushes, lifting systems, diver equipment or other loads or materials, during which a crane system built into the edifice can be used. Finally, the rail device can also be used as a climbing aid for divers. As a result, the invention offers a complete habitat and trap solution that can be used to especially beneficial effect for the commercial care and propagation of economically useful animals and their sustained harvesting in preferably large offshore edifice groups, such as wind parks. However, it could also make good sense in some cases to erect separate edifices for the device according to an embodiment of the present invention, or retrofit already existing offshore edifices with the rail device. The rail-carriage system can further be used for the upkeep, maintenance and inspection of offshore edifices. The advantage is that only one or a few scavenging carriages need to be held in reserve, so that all rails are used, and a wide variety of tasks can be implemented.

The netting array is deployed precisely to the location by means of the habitat carriage and rail device, which is vertically arranged on the foundation structure of the offshore edifice. Only a single vertical rail system can here be provided on the periphery of the edifice. In particular in the case of round edifices, such as wind power pylons, several vertical rail devices (and correspondingly more habitat carriages, but also just one scavenging carriage used to scavenge all habitat carriage) can also be situated around the periphery. For example, four paired diametrically opposed rail devices can be provided. Even when several rail devices are arranged closely together, deploying the habitat and trapping baskets to the precise location via the habitat carriages on the rail devices reliably ensures that the individual components will not impede or impair each other.

For example, the basic unit of the habitat carriage on the rail system is introduced from a ship proceeding from the upper end of the rail device or via corresponding recesses in the underwater region of the rail device. It is here advantageous that the rail device be equipped with a T-shaped guide rail, and the running unit of the habitat carriage and scavenging carriage be furnished with a T-shaped guide groove. For example, the T-shaped guide rail can here be securely bolted to the edifice in a simple manner, or simply be welded on as a steel rail in an advantageous embodiment. The T-shaped guide groove of the running unit engage via the T-shaped guide rail, thereby reliably ensuring guidance in a vertical (toward the rails) and horizontal (orthogonal to the rail) direction. To ensure that the T-shaped guide groove effectively glides over the T-shaped guide rail, the T-shaped guide groove can additionally be provided with running rollers, which roll onto the T-shaped guide rail from behind. To prevent the habitat carriage from tipping over sideways on the T-shaped guide rail, the habitat carriages and scavenging carriages are provided with spacers for purposes of lateral stabilization. The spacers support the habitat and scavenging carriage directly against the edifice to the right and left of the vertical guide rail.

The T-shaped design of the guide rail and guide groove already provides a reliable safeguard that prevents the carriage from lifting off of the rail device during submersion or retrieval. To reliably prevent the carriages from tilting in the horizontal direction due to a slight (buoyancy or current induced) lifting of the carriage, it would be advantageous to provide at least one guide roller that abuts the offshore edifice and weights that exert a force acting horizontally on the offshore edifice (secured via a rotatably mounted lever arrangement), at least on the scavenging carriage. The weights press the scavenging carriage against the edifice via the lever arrangement and a guide roller. In addition, the roller design allows the scavenging carriage to easily traverse the edifice. Since the scavenging carriage is also lowered exclusively by downward drift, this process can be accelerated with additional weights on the scavenging carriage with a force acting vertically downward, thereby enabling an especially quick scavenging of the habitat carriage. All aforementioned measures can be performed in equal measure on the habitat carriage as well. The latter can have an additional, weight-assisted guidance and additional downward drift weights.

The lower end of the scavenging carriage preferably has a reception flange. This flange can accommodate various tools, which perform different functions. For example, an underwater video camera can be added when not using the scavenging carriage to retrieve the habitat carriage, but to observe the animals underwater or inspect the edifice. In order to retrieve the habitat carriage, it is preferred to immovably arrange a scavenging bracket on the reception flange of the scavenging carriage, and a scavenging mandrel on the upper end of the habitat carriage. The scavenging bracket latches securely, but detachably, in the scavenging mandrel of the habitat carriage as the scavenging carriage is vertically submerged, thereby also taking along the habitat carriage when retrieving the scavenging carriage by means of the lifting device. The lifting device for the scavenging carriage can preferably be a manually operated or electrical cable winch, which is secured either directly to the offshore edifice, or to a working platform or a service ship.

As stated further above, the habitat carriage is used to enlarge the habitat for hardground animals, only a few if any of which would otherwise be found in the softground regions of most offshore edifices. To maximize this expansion, it is advantageous to equip the habitat and trapping basket of the habitat carriage with a foldout habitat and trapping flap. The habitat and trapping basket can already be submerged with the habitat and trapping flap open. The habitat and trapping flap then is immersed even further in the lower position of the trapping basket, and sits on the seafloor at an angle, or lies horizontally on the seafloor. The direct contact between the habitat and trapping flap and the seafloor makes it especially easy for the animals walking around down there to reach the habitat and trapping flap and habitat and trapping basket, especially lobsters and crabs. In order to maximize the harvest of these animals when hauling in the trapping basket or habitat carriage, it makes sense to close the habitat and trapping flap beforehand. To this end, the device according to an embodiment of the present invention can be provided with another scavenging mandrel detachably arranged on a reception pin on the scavenging mandrel on the habitat carriage, and at least one flap rope, one end of which is secured to the upper end of the habitat and trapping flap. To improve closure, two spaced apart flap ropes can also be provided at the upper end of the habitat and trapping flap. The other end of each flap rope is secured to the additional scavenging mandrel, and is guided through a correspondingly arranged eyelet at the upper end of the habitat carriage. When the scavenging bracket on the scavenging carriage now latches into the additional scavenging mandrel, the latter is pulled off while retrieving the reception pin, pulling the flap rope up through the eyelets. The eyelets are here situated on the habitat and trapping flap in such a way that no tilting moment arises while retrieving the habitat carriage. During retrieval, the habitat and trapping flap is closed, and the closed habitat carriage is pulled up on the flap rope. In principle, this type of closure mechanism can also only be implemented with a detachable scavenging mandrel sitting on a simple reception pin. However, the additional scavenging mandrel provides for a dual scavenging option for the habitat carriage. For example, if the additional scavenging mandrel slips off the scavenging bracket or was removed owing to outside influences (e.g., objects drifting to and fro), or the flap ropes are torn, the habitat flap does open again, but the entire habitat carriage can still be reliably scavenged by now again latching the scavenging bracket directly onto the rigidly mounted scavenging mandrel of the habitat carriage.

The habitat and trapping flap serves to enlarge the habitat surface, and hence improve the harvest yield. In order to increase the latter even further, the habitat and trapping basket of the habitat carriage can advantageously be fitted with attractive add-ons for colonization by the hardground animals, for example closed or halved tube pieces, and/or additional pivoting small flap baskets at the lower end of the habitat and trapping basket. The flap baskets swivel into the horizontal position when retrieving the habitat carriage, making it possible to also harvest animals that fall out of the habitat and trapping basket, and animals from the space between the habitat and trapping basket and edifice. In addition, the positioning stability of the habitat and trapping basket and the habitat and trapping flap can be improved by providing penetrating mandrels at the lower end of the habitat and trapping basket and/or at the upper end of the habitat and trapping flap. When the habitat carriage and habitat and trapping flap are placed on the seafloor, these mandrels provide stabilization by digging into the soft seafloor. When retrieving the habitat carriage, they are simply removed from the soft seafloor again.

In addition, the habitat and trapping basket of the habitat carriage can be straight, curved or angled in its horizontal cross section. This allows it to be optimally adjusted to the surface shape of the offshore edifice. A curved shape is advantageous in particular in light of the generally round pylons of air power plants. Finally, a brush arrangement that touches the offshore edifice can advantageously be provided over the width of the habitat carriage. As a result, animals colonizing the gap are brushed off when hauling up the habitat carriage. If desired, these animals can be harvested as well in the lower trapping baskets on the habitat carriage. Otherwise, they drop to the floor, and are there used by the colonizing animals as nutrition. The same applies to colonized fauna, so that the surface of the edifice is thoroughly cleaned in the area of the device according to the invention. Other design details relating to the device according to embodiments of the present invention can be gleaned from the exemplary embodiments described below.

FIG. 1 shows an offshore edifice 01 in the form of a pylon 02 of a wind power plant with a vertically arranged rail device 03. The rail device 03 is here designed as a simple T-shaped guide rail 04, and extends over the height 05 of the underwater region 06 until above the waterline 07. The rail device 03 has a vertically movable scavenging carriage 08, which consists of a basic unit 09 and a running unit 10. In the exemplary embodiment shown, the running body 10 of the scavenging carriage 08 is placed on the guide rail 04 in the area of recesses 49. To enable threading at various heights, several recesses 46 can be provided along the guide rail 04 above the waterline 07. The scavenging carriage 08 can also be placed on the end of the guide rail 04, for example if the end can be reached from a boat. The running unit 10 rolls onto the guide rail 04 via running rollers 46. In addition, the depicted scavenging carriage 08 has a guide roller 11 that abuts the offshore edifice 01, and weights 12 that exert a force via a rotatable lever arm 13 horizontally on the offshore edifice 01 on the scavenging carriage 08, thereby reliably preventing the scavenging carriage 08 from lifting up due to upward drift, currents and wave dynamic. The lever arm 13 is here pivoted to a transverse axis 48 in the spacer 25. Additional weights 14 are also provided to increase the drifting rate of the scavenging carriage 08 (similar to habitat carriages 22).

The upper end of the scavenging carriage 08 had an eyelet 15 for attaching a scavenging rope 16, which is used to retrieve the scavenging carriage 08 via a lifting device 44. The lower end of the scavenging carriage 08 has a reception flange 17 to secure various tools. In the embodiment shown, the reception flange 17 accommodates a scavenging bracket 18 (detailed sectional view). The scavenging bracket 18 has an introduction area 19 and, in the exemplary embodiment shown, flap segments 20 with an opening lever 46, which serve to securely, but detachably, hold a scavenging mandrel 21. This scavenging mandrel 21 is denoted with dashed lines on FIG. 1, and belongs to a habitat carriage 22 explained in greater detail on FIG. 3. As evident from FIG. 1, the shoulder 23 of the scavenging mandrel 21 sits on the flap segments 20 after having been retrieved by submerging the scavenging carriage 08 or scavenging bracket 18 through the introduction area 19 inside the scavenging bracket 18, and lifted up the flap segments 20. The scavenging mandrel 21 is detached from the scavenging bracket 18 by simply jimmying the unloaded flap segments 20 with an opening lever 47.

FIG. 2 shows a cross section through the pylon 02, the rail device 03, the basic unit 09 and the running unit 10. Both the scavenging carriage 08 and the habitat carriage 22 essentially exhibit a basic unit 09 and a running unit 10, which can advantageously be identical in design, but do not have to be. As evident from the cross section, the rail device 03 is formed by the T-shaped guide rail 04. For example, this case can involve a simple steel rail securely welded to the pylon 02. The basic unit 09 has a running unit 10 with a T-shaped guide groove 24, which overlaps the T-shaped guide rail 04. This yields a reliable axial and good radial guidance. To improve the latter even more, the basic unit 09 also has spacers 25 to laterally stabilize the basic unit 09. The latter are trapezoidally molded out of a tube in the exemplary embodiment shown. The arrangement described above with lever 13 and weight 12 to press the scavenging carriage 08 or habitat carriage 22 against the edifice 01, 02 is not shown in any greater detail on FIG. 2. Two such arrangements are essentially situated to the right and left on scavenging carriages 08 or habitat carriages 22. The rotatable levers 13 are mounted on a longitudinal axis between the spacers 25 situated between the transverse axis 48.

In addition, FIG. 2 shows a habitat and trapping basket 26 as a netting array 45 with dashed lines to highlight its different possible shapes. In the case of the round pylon 02, a correspondingly curved variant is advantageous (variant a). As an alternative, it can also be polygonal (variant b). Given flat surfaces of the offshore edifices 01, the habitat and trapping basket 26 can also be given a correspondingly planar design (variant c). Also depicted is the width 27 of the basic unit 09 of the habitat and trapping basket 26, which influences its stability and effectiveness relative to growing and harvesting the hardground animals.

FIG. 3 shows a side view of the submerged habitat carriage 22, which in conjunction with the rail device 03 and scavenging carriage 08 makes up the main components of the device 28 according to the invention. The basic unit 09 and running unit 10 of the habitat carriage 22 are shown, wherein the running unit 10 engages the T-shaped guide rail 04 of the vertical rail device 03. The basic unit 09 of the habitat carriage 22 carries the habitat and trapping basket 26, which has a habitat and trapping flap 29 that is opened in the state depicted. The habitat and trapping basket 26 is submerged to maximum depth via the rail device 03 while still preserving the coupling, and secured to the seafloor 31 by a penetrating mandrel 30 that digs into the ground. The habitat and trapping flap 29 is opened all the way, and also anchored to the seafloor 31 by means of another penetrating mandrel 32. In this way, the habitat and trapping basket 26 and habitat and trapping flap 29 are effectively safeguarded against slippage caused by exposure to sea currents. The habitat and trapping basket 26 and habitat and trapping flap 29 have nettings 33 and various add-ons 34 for effectively harvesting and colonizing marine hardground animals 35. The add-ons 34 are situated on either side of the basic unit 09 and the habitat and trapping flap 29. They can exhibit known shapes, and take the form of tubes or half-tubes 36 in the case of add-ons 34. Also provided are small flap baskets 37, which are used for additional harvesting when retrieving the habitat carriage 22. In the selected exemplary embodiment, these flap baskets 37 are connected with the habitat and trapping flap 29, and pivoted simultaneous with their closure. One flap basket 37 also has a brush arrangement 38 used to clean and strip animals and plants on the pylon 02 during retrieval (see also FIG. 5).

For retrieval purposes, the upper end of the basic unit 09 of the habitat carriage 22 has the fixed scavenging mandrel 21. The latter has a reception pin 39, which detachably accommodates another scavenging mandrel 40. This additional scavenging mandrel 40 is connected with two flap ropes 41 (see FIG. 5), which each are guided through an eyelet 42 at the upper end of the habitat and trapping basket 26, and securely fastened with the upper end of the habitat and trapping flap 29. While being submerged, the scavenging bracket 18 of the scavenging carriage 08 overlaps the additional scavenging mandrel 40, pulling it down from the reception pin 39 during retrieval of the scavenging carriage 08. Pulling up the flap rope 41 initially closes the habitat and trapping flap 29 (arrow with flap rope 41 shown with dashed lines and taut), after which the habitat carriage 22 is pulled up. If the additional scavenging mandrel 40 slips out of the scavenging bracket 18 or be otherwise removed, or if the flap ropes 41 tear, the habitat carriage 22 can now still be safely scavenged via the fixed scavenging mandrel 21 by again hooking in the scavenging bracket 18. The habitat and trapping flap 29 again opens and releases part of the catch, but does not further impede the scavenging process. FIG. 3 shows another spacer 43 for stabilizing the habitat carriage 22 during submergence and retrieval.

Figure 4:
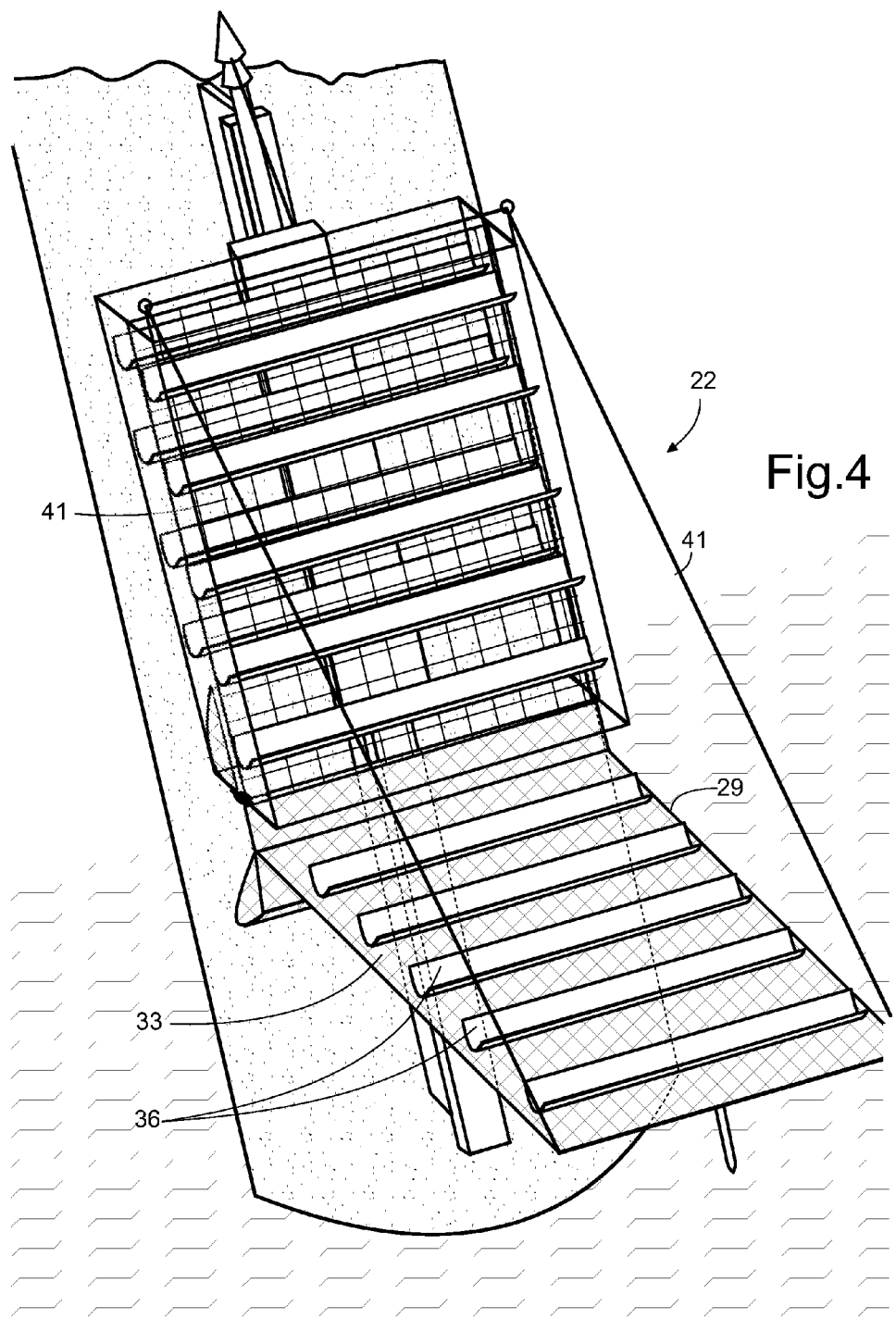
FIG. 4 is a perspective view of the submerged habitat carriage with opened habitat and trapping flap.

FIG. 4 shows the submerged, opened habitat carriage 22 according to FIG. 3 in a perspective view; the corresponding reference numbers and explanations can be gleaned from FIG. 3. As clearly evident from FIG. 4, the two flap ropes 41 are on the upper end of the habitat and trapping flap 29, and the half-tubes 36 on the netting 33.

Figure 5:
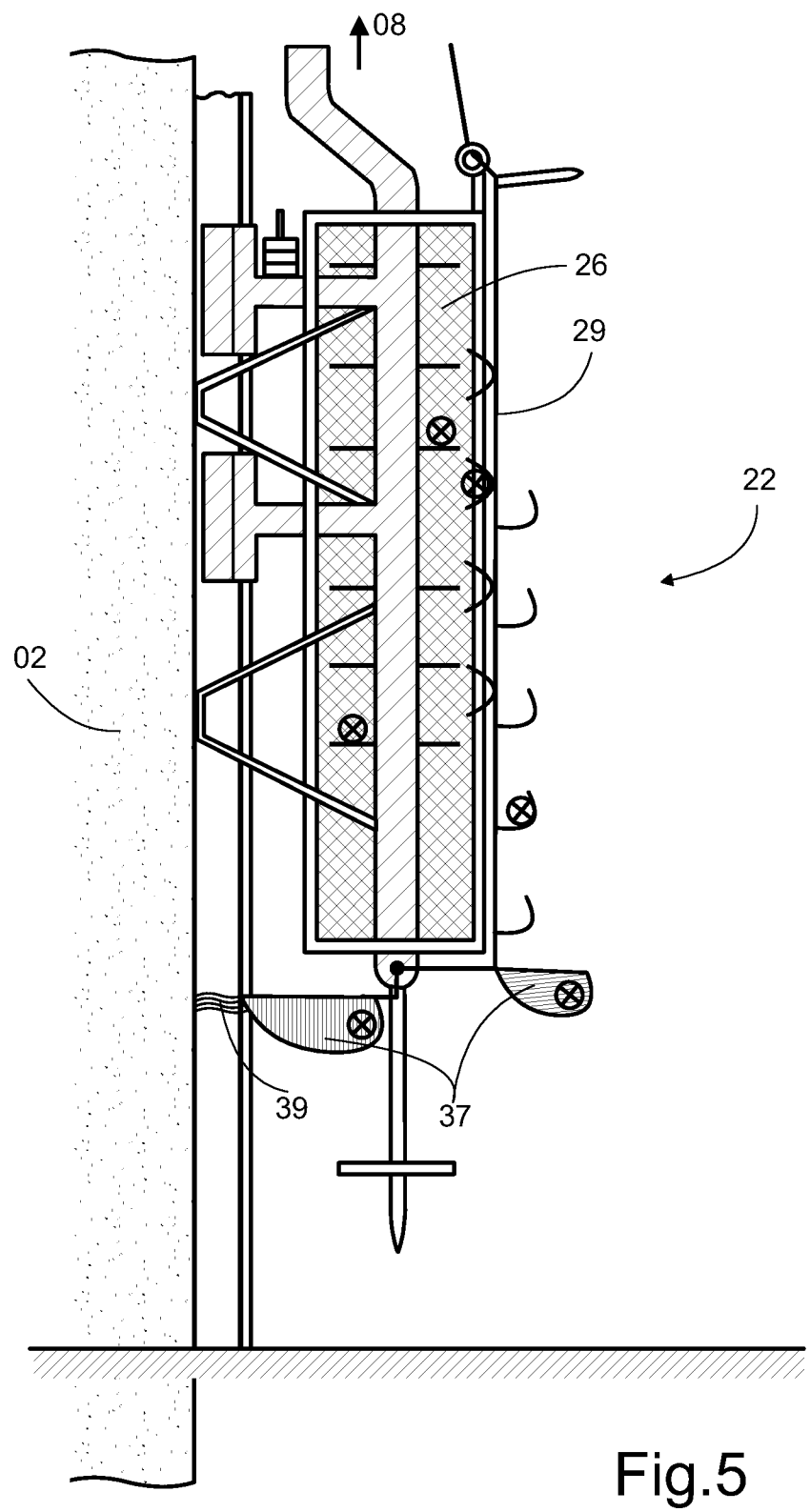
FIG. 5 is a side view of the habitat carriage with closed habitat and trapping flap during retrieval.

Finally, FIG. 5 shows the closed habitat carriage 22 during retrieval with the scavenging carriage 08; the corresponding reference numbers and explanations can again be gleaned from FIG. 3. Clearly evident in this depiction are the closed habitat and trapping basket 26 with the pulled up habitat and trapping flap 29, and the flap basket 37 that is folded into a horizontal positon as a result, and the brush arrangement 39 that brushes off the pylon 02.

While the invention has been particularly shown and described with reference to preferred embodiments thereof, it will be understood by those skilled in the art that various changes in form and details may be made therein without departing from the spirit and scope of the invention.

REFERENCE LIST

01 Offshore edifice
02 Pylon
03 Rail device
04 T-shaped guide rail
05 Height of underwater region
06 Underwater region
07 Waterline
08 Scavenging carriage
09 Basic unit
10 Running unit
11 Guide roller
12 Weight
13 Lever arm
14 Additional weight
15 Eyelet
16 Scavenging rope
17 Reception flange
18 Scavenging bracket
19 Introduction area
20 Flap segment
21 Scavenging mandrel
22 Habitat carriage
23 Shoulder
24 T-shaped guide groove
25 Spacer
26 Habitat and trapping basket
27 Width of basic unit
28 Device for colonizing and harvesting marine hardground animal
29 Habitat and trapping flap
30 Penetrating mandrel
31 Seafloor
32 Additional penetrating mandrel
33 Netting
34 Add-on
35 Marine hardground animal
36 Half-tubes
37 Flap basket
38 Brush arrangement
39 Reception pin
40 Additional scavenging mandrel
41 Flap rope
42 Eyelet
43 Additional spacer
44 Lifting device
45 Netting array
46 Running roller
47 Opening lever
48 Transverse axis
49 Recess in T-shaped guide rail

The invention claimed is:

1. A device for colonizing and harvesting marine hardground animals in an underwater region of a ground-based offshore edifice, the device comprising:
at least one rail device configured to extend vertically on the offshore edifice along a height of the underwater region to above a waterline;
a netting array including a habitat carriage having a habitat and trapping basket adapted to contain the hardground animals;
a lifting device configured to move the netting array along the at least one rail device; and
a scavenging carriage including a basic unit and a running unit configured to detachably couple the scavenging carriage with the at least one rail device so as to be movable thereon, the scavenging carriage being movable along the at least one rail device separately from the habitat carriage and being configured to detachably couple with the habitat carriage and the lifting device such that the habitat carriage is retrievable from the underwater region by the scavenging carriage using the lifting device.

2. The device according to claim 1, wherein the at least one rail device includes a plurality of rail devices, wherein a corresponding number of the netting arrays, each including a habitat carriage, is provided, and wherein the scavenging carriage detachably couples with each of the plurality of the rail devices and is movable thereon.

3. The device according to claim 2, wherein the plurality of rail devices have a T-shaped guide rail including recesses configured to accommodate the habitat carriages and the scavenging carriage.

4. The device according to claim 1, wherein the at least one rail device includes a T-shaped guide rail, the running unit of the scavenging carriage and a running unit of the habitat carriage include a T-shaped guide groove, and the habitat carriage and the scavenging carriage include a spacer adapted to provide lateral stabilization.

5. The device according to claim 1, wherein at least one of the scavenging carriage and the habitat carriage include at least one guide roller abutting the offshore edifice and having a weight disposed thereon so as to exert a horizontal force against the offshore edifice.

6. The device according to claim 1, wherein at least one of the scavenging carriage and the habitat carriage include a weight disposed thereon so as to exert a downward vertical force.

7. The device according to claim 1, wherein the scavenging carriage includes a reception flange having a scavenging bracket affixed thereon, the scavenging bracket being configured to detachably latch securely, as the scavenging carriage is submerged vertically, to a scavenging mandrel affixed on an upper end of the habitat carriage.

8. The device according to claim 1, wherein the habitat and trapping basket includes a foldout habitat and trapping flap that is configured to be open in the underwater region such that the habitat and trapping basket is accessible to the marine hardground animals.

9. The device according to claim 7, wherein the scavenging mandrel includes a reception pin on which an additional scavenging mandrel is detachably disposed, the habitat and trapping basket including a foldout habitat and trapping flap, and the device further comprising at least one flap rope attached at one end to an upper end of the habitat and trapping flap and at the other end to the additional scavenging mandrel, wherein the at least one flap rope is guided through a correspondingly arranged eyelet at the upper end of the habitat carriage such that the scavenging bracket latches into the additional scavenging mandrel as the scavenging carriage is submerged vertically.

10. The device according to claim 1, wherein the habitat and trapping basket includes at least one of an additional pivoting flap basket and an add-on device configured to attract the hardground animals to colonize.

11. The device according to claim 1, wherein penetrating mandrels are disposed on at least one of a lower end of the habitat and trapping basket and an the upper end of the habitat and trapping flap.

12. The device according to claim 1, wherein the habitat and trapping basket includes a horizontal cross section that is at least one of straight, curved and angled, 13. The device according to claim 1, further comprising a brush arrangement disposed over a width of the habitat carriage so as to touch the offshore edifice.

* * * * *